(12) United States Patent
Maggiolo et al.

(10) Patent No.: US 11,550,068 B2
(45) Date of Patent: Jan. 10, 2023

(54) MODELING MUTABLE ENVIRONMENTAL STRUCTURES

(71) Applicant: Google LLC, Mountain View, CA (US)

(72) Inventors: Stefano Maggiolo, London (GB); Imad Jean Fattouch, Mountain View, CA (US); Andrea Marchesini, London (GB); Zixuan Qu, London (GB); Zifei Tong, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 110 days.

(21) Appl. No.: 17/006,833

(22) Filed: Aug. 29, 2020

(65) Prior Publication Data
US 2022/0066053 A1   Mar. 3, 2022

(51) Int. Cl.
*G01S 19/51* (2010.01)
*G01S 19/25* (2010.01)
*G01S 19/26* (2010.01)
*G06K 9/62* (2022.01)

(52) U.S. Cl.
CPC .............. *G01S 19/51* (2013.01); *G01S 19/25* (2013.01); *G01S 19/26* (2013.01); *G06K 9/6256* (2013.01)

(58) Field of Classification Search
CPC ........... G01S 19/51; G01S 19/25; G01S 19/26
USPC ..................................................... 455/456.1
See application file for complete search history.

(56) References Cited

U.S. PATENT DOCUMENTS

| | | | |
|---|---|---|---|
| 7,456,812 B2 | 11/2008 | Smith et al. | |
| 8,564,579 B2 | 10/2013 | Kwon | |
| 11,092,716 B1* | 8/2021 | Pust | ........................ G01S 19/14 |
| 2019/0237001 A1 | 8/2019 | Lin et al. | |
| 2020/0098135 A1* | 3/2020 | Ganjineh | ................... G06T 7/74 |
| 2020/0349362 A1* | 11/2020 | Maloney | .................... G06T 7/70 |
| 2021/0239848 A1* | 8/2021 | Karvounis | ............ G01S 19/243 |

FOREIGN PATENT DOCUMENTS

CN      106128358 A      11/2016

\* cited by examiner

*Primary Examiner* — Chuck Huynh
(74) *Attorney, Agent, or Firm* — Honigman LLP; Brett A. Krueger

(57) ABSTRACT

A method of modeling mutable environmental structures includes receiving an estimated location of a Global Navigation Satellite Systems (GNSS) receiver in an environment and a plurality of GNSS-related features corresponding to a GNSS signal received at the GNSS receiver. The method also includes determining a plurality of candidate positions about the estimated location for the GNSS receiver. Each candidate position corresponds to a possible actual location of the GNSS receiver in the environment. For each candidate position, the method further includes generating, as an output from a GNSS localization model configured to receive the plurality of GNSS-related features as input, a respective probability that the respective candidate position includes the actual location of the GNSS receiver. The method also includes selecting from the plurality of candidate positions, the respective candidate position having a greatest probability as the actual location of the GNSS receiver.

24 Claims, 5 Drawing Sheets

MODELING MUTABLE ENVIRONMENTAL STRUCTURES

TECHNICAL FIELD

This disclosure relates to modeling mutable environmental structures.

BACKGROUND

Global Navigation Satellite Systems (GNSS) use radio signals transmitted by orbiting satellites to determine precise ground locations, enabling advanced navigation and location-based services. Typically, a GNSS receiver receives one or more radio signals transmitted by the orbiting satellites and the GNSS receiver, or a locational system associated with the GNSS receiver, is able to determine the position of the GNSS receiver based on the timing of messages received from satellite(s) (e.g., often at least four satellites). Each message specifies the time of transmission and the position of the satellite at the time of transmission. The receiver or the locational system can compute the time of transit for each received message and often, using navigation equations, the location of the receiver. The location of the receiver may then be utilized by various applications ranging from telecommunication to navigation. As the number of applications that incorporate some aspect of GNSS-based localization continues to grow, these applications rely on the GNSS-based localization to be not only accurate in an open-sky environment, but also an urban environment. This is especially true when urban environments are densely populated with users of location-based services that deploy GNSS-based localization.

SUMMARY

One aspect of the disclosure provides a method of modeling mutable environmental structures. The method includes, receiving at data processing hardware, an estimated location of a Global Navigation Satellite Systems (GNSS) receiver in an environment and a plurality of GNSS-related features corresponding to a GNSS signal received at the GNSS receiver. The method also includes determining, by the data processing hardware, a plurality of candidate positions about (e.g., around, surrounding, near, adjacent, etc.) the estimated location for the GNSS receiver. Each candidate position of the plurality of candidate positions corresponds to a possible actual location of the GNSS receiver in the environment. For each candidate position of the plurality of candidate positions, the method further includes generating, by the data processing hardware, as an output from a GNSS localization model configured to receive the plurality of GNSS-related features as input, a respective probability that the respective candidate position includes the actual location of the GNSS receiver. The method also includes selecting, by the data processing hardware, from the plurality of candidate positions, the respective candidate position having a greatest probability generated as output from the GNSS localization model as the actual location of the GNSS receiver.

Another aspect of the disclosure provides a system for modeling mutable environmental structures. The system includes data processing hardware and memory hardware in communication with the data processing hardware. The memory hardware stores instructions that when executed on the data processing hardware cause the data processing hardware to perform operations. The operations include receiving an estimated location of a Global Navigation Satellite Systems (GNSS) receiver in an urban environment and a plurality of GNSS-related features corresponding to a GNSS signal received at the GNSS receiver. The operations also include determining a plurality of candidate positions about (e.g., around, surrounding, near, adjacent, etc.) the estimated location for the GNSS receiver. Each candidate position of the plurality of candidate positions corresponds to a possible actual location of the GNSS receiver in the urban environment. For each candidate position of the plurality of candidate positions, the operations further include generating as an output from a GNSS localization model configured to receive the plurality of GNSS-related features as input, a respective probability that the respective candidate position includes the actual location of the GNSS receiver. The operations also include selecting, from the plurality of candidate positions, the respective candidate position having a greatest probability generated as output from the GNSS localization model as the actual location of the GNSS receiver.

Each aspect of the disclosure may include one or more of the following optional features. In some implementations, the GNSS localization model is trained on a plurality of training examples where each training example includes: GNSS measured features for a respective GNSS signal; modeled signal features for the respective GNSS signal, and a corresponding label indicating a respective actual location of a respective GNSS receiver receiving the respective GNSS signal. In these implementations, the GNSS measured features include at least one of positional information, timing information, or satellite information. The GNSS measured features may include a pseudorange from a satellite transmitting the GNSS signal and a time of flight for the GNSS signal. In these implementations, the modeled signal features include one or more features related to an excess signal length for the GNSS signal. The modeled signal features may include a feature indicating a deciduousness of foliage for the environment. Here, the feature indicating the deciduousness of foliage for the environment represents a seasonality attribute of the foliage.

In some examples, the GNSS localization model includes a convolutional neural network (CNN). The CNN may be configured to, for each candidate position of the plurality of candidate positions, perform three-dimensional (3D) convolution for a first dimension including a latitude of the respective candidate position, a second dimension including a longitude of the respective candidate position, and a third dimension representing a satellite transmitting the GNSS signal to the GNSS receiver and, based on the 3D convolution, perform two-dimensional (2D) convolution for the first dimension and the second dimension. After the 2D convolution, the CNN may also be configured to process all of the candidate positions using a fully-connected layer. In these examples, a particle filter may perform particle filtering of the respective probability generated as the output from the GNSS localization model for each candidate position of the plurality of candidate positions to identify the actual location of the GNSS receiver as the respective candidate position having the greatest probability. Optionally, in these examples, the CNN may be configured to, for each candidate position of the plurality of candidate positions, perform four-dimensional (4D) convolution for a fourth dimension of time (e.g., prior to the 3D convolution).

In some examples, the GNSS signal received at the GNSS receiver includes a reflected signal having one or more reflections within the urban environment. The method or system may also include identifying that the GNSS signal includes a reflected GNSS signal, determining an excess path length for the reflected GNSS signal, and, based on the excess path length, generating one or more respective GNSS-related features for input into the GNSS localization model.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
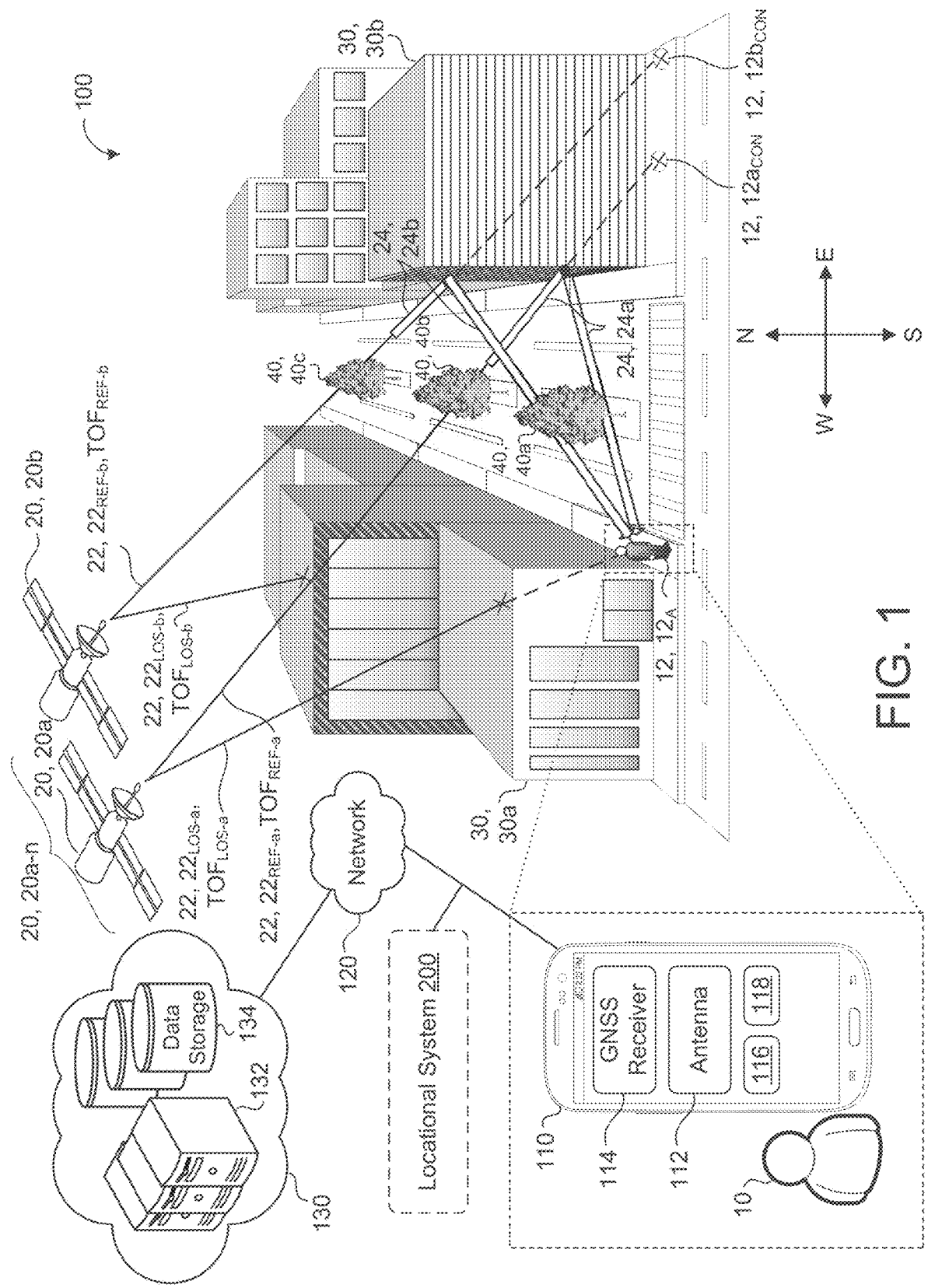
FIG. 1 is a perspective view of an example urban environment where a GNSS receiver is located.

As GNSS-based localization has become a ubiquitous part of location-based services, GNSS receivers have been incorporated into numerous computing devices. With the incorporation of a GNSS receiver, a computing device is considered a GNSS-enabled device that may perform some role to support GNSS localization whether that be receipt of a signal transmitted by a satellite (i.e., a GNSS signal) or the entire computation of a location for the GNSS receiver. Here, GNSS localization refers to the function of determining the location of a GNSS component such as the GNSS receiver. Therefore, when a computing device includes a GNSS receiver, GNSS localization determines the location of the GNSS receiver and also, by association, may determine the location of the GNSS-enabled device. This allows GNSS localization to be implemented in order to locate almost any object outfit as a GNSS-enabled device. As a result, GNSS localization has been deployed to locate agriculture equipment, transportation vehicles (e.g., cars, trucks, trains, planes, etc.), mobile devices (e.g., mobile phones, laptops, tablets, etc.), wearables (e.g., smart watches), internet of things (IOT) devices, and/or other GNSS-enabled devices.

A GNSS receiver is configured to receive GNSS signals from one or more visible orbiting satellites. Here, a visible satellite or available satellite refers to a particular orbiting satellite that transmits a GNSS signal of sufficient magnitude for the GNSS localization process (e.g., by the GNSS receiver or a localization system associated with the GNSS receiver) to utilize in position and navigational determinations. In contrast, there may be other orbiting satellites that are non-visible orbiting satellites. A non-visible orbiting satellite or non-available satellite refers to a satellite for which the received GNSS signal is of insufficient magnitude to be utilized in position and navigational determinations in a GNSS localization process. Stated differently, an available satellite is considered "in communication with the GNSS receiver" because the GNSS receiver receives a GNSS signal of sufficient magnitude from an available or visible satellite. Although GNSS localization would prefer that satellites are visible (available) rather than not visible (not available), whether a satellite is visible to a GNSS-enabled device or not may be contingent on the environment or terrain about a GNSS-enabled device. In other words, when a GNSS-enabled device is in an open field, the open-field environment includes little if any terrain features that may inhibit a GNSS receiver from receiving a signal transmitted by an orbiting satellite. For instance, numerous satellites are visible in an open field. On the other hand, when a GNSS-enabled device is in a canyon surrounded by tall rock formations, there is likely to be only a small number of visible satellites, if any, and a greater number of non-visible satellites.

When a GNSS receiver is in a city or an urban environment, the GNSS receiver's ability to receive satellite signals is often more akin to a canyon than an open field. In a city or urban environment, the signals from one or more satellites may be blocked or attenuated by the structures or buildings of the city. To compound the issue that a GNSS receiver may have fewer visible (or available) satellites in an urban environment, the signals from satellites that are visible to the GNSS receiver are more likely being redirected (e.g., reflected, refracted, diffracted, or scattered one or more times) in the urban environment (e.g., off of structures or by structures) during their path to the GNSS receiver. These redirected (e.g., reflected) signals pose issues to systems that perform GNSS localization (referred to as locational systems) because GNSS localization uses time of flight for the path of the signal and assumes that received signals, whether redirected (e.g., reflected) or not, are line of sight signals. In other words, a line of sight signal has a path that extends from the satellite to the receiver without any redirection. Since, in reality, the signal is a redirected signal and seldom a line of sight signal, the redirection of the signal actually causes the signal to travel a greater distance than a distance traveled by a line of sight signal. Here, the difference between a line of sight signal and the greater distance of the actual or reflected signal is referred to as excess path length. The term excess path length identifies that the path of the reflected signal to the receiver has a longer (i.e., "excess") path length due to its reflection(s) than the path would have had as a direct line of sight signal.

Unfortunately, the traditional GNSS localization, which is configured to identify where the receiver is located, inherently makes the assumption that signals received at the receiver are line of sight signals, even if they are, in reality, redirected signals. With this assumption, the location system often inaccurately identifies the location of the receiver in an urban space. An example manifesting this inaccuracy is that rideshare platforms using the GNSS system of GPS have a tendency to believe that a rideshare customer is on the other side of the street in an urban setting. Here, the rideshare customer's GPS receiver interprets its location on the wrong side of the street due to the excess path length of the reflected signal and relays this incorrect location to the rideshare driver via the rideshare platform. Since it is fairly common for locational systems in an urban environment to determine the location of the GNSS receiver on the wrong side of the street due to the excess path length, the GNSS industry sometimes refers to this problem as "the-wrong-side-of-the-street" problem.

A few different approaches have attempted to address the issues of locational accuracy for a GNSS receiver in an urban environment. For example, the locational system may integrate or use an inertial system to improve the locational accuracy. In other words, the GNSS receiver or a device associated with the GNSS receiver may employ motion sensors, such as accelerometers and/or rate gyros. The locational system may then use the measurements from these sensors to determine a position for the GNSS receiver. Yet here, there are significant drawbacks to using an inertial system to supplement the localization. For instance, for the inertial system to be accurate at identifying a location of the GNSS receiver when reflected signals occur within an urban environment, the inertial system first needs an accurate determination of the GNSS receiver position. To initially begin with an accurate determination of the GNSS receiver position, the locational system would need a direct or line of sight signal that is not reflected to establish an initial GNSS receiver position for the inertial system. Without an accurate initial GNSS receiver position, the inertial system will lack an accurate reference state upon which to base its measurements. This approach therefore requires a relatively open area where GNSS signals may be received with no reflections prior to using the inertial system. The significant drawback with this approach is that, for pedestrians or even vehicles that start or reside entirely in the urban environment, a relatively open area is not available; causing the inertial system to be ineffective for supplemental localization when GNSS signals are being reflected in the urban environment. Additionally, an inertial system may increase cost, consume more processing resources, and/or occupy precious computing real estate for GNSS-enabled devices that have smaller envelopes. Furthermore, although mobile devices may have some existing inertial components (e.g., a mobile phone is able to determine its orientation), the inertial components in mobile devices, and particularly cellular phones, are rather rudimentary and incapable of performing localization to a high degree of accuracy.

Another approach to correcting locational inaccuracies for GNSS receivers in urban environments is referred to as shadow matching. Shadow matching is an approach that uses the signal strength received at a GNSS receiver to infer where the receiver is actually located. The premise is that if a signal from a satellite, for example, in the East has a weak signal strength detected at the GNSS receiver (e.g., due to redirection), it is presumed that the GNSS receiver is in a shadow of a building to the East. The premise is then applied in the aggregate to all satellites and their corresponding signals in order to converge on an estimated position for the GNSS receiver. Although this approach and variations to this approach have proven partially effective to correct locational inaccuracies for GNSS receivers in urban environments, the approach oversimplifies the cause of the issue. The signal strength received at a GNSS receiver may vary for reasons other than the signal being reflected off structures. For instance, the signal strength varies because the GNSS signal has to pass through a particular medium before reaching the receiver. In other words, the signal may be attenuated by foliage within the city or a body of a person carrying the GNSS receiver (e.g., the GNSS signal is a mobile device in a pocket of a person). Moreover, the type of GNSS receiver or type of GNSS-enabled device may also affect the signal strength for a GNSS signal. Without a way to account for these factors, shadow matching sometimes fails to be an effective approach for fixing the wrong-side-of-the-street problem on its own.

The locational inaccuracy may also be addressed by attempting to correct the excess path length that results in the GNSS receiver being perceived in the wrong location. Yet a correction approach may be difficult to implement because, in order to determine the excess path length of a reflected signal contributing to the locational error, the correction approach would be need the location of the GNSS receiver; presenting a chicken-and-egg problem since the excess path length inherently obfuscates that location. One way of implementing a correction approach is to first approximate the location of the GNSS receiver and then, based on the approximate location and the signal strength of the GNSS signal at the GNSS receiver, the approach determines the excess portion of the path length for the reflected signal. The determined excess path length may then be, for example, provided as feedback to an entity responsible for the functionality of the GNSS receiver (e.g., a GNSS receiver chipset provider). By providing this feedback, the responsible entity may use the determined excess path length to improve the locational positioning functionality of the receiver in the future, eventually reducing locational errors caused by reflected signals. A setback to this approach is that it requires additional coordination (e.g., with the responsible entity), feedback loops between potentially multiple parties, and is an approach that is reliant on the accuracy of the estimated position of the GNSS receiver.

Another approach to overcome localization issues in an urban environment that does not rely on signal strength instead leverages the movement of the GNSS receiver A GNSS signal from a satellite has a particular frequency. Yet when a moving GNSS receiver receives that signal, the particular frequency changes as a function of the GNSS receiver motion. In other words, a Doppler effect modifies the frequency of the GNSS signal based on the motion of the GNSS receiver. Doppler effect refers to a change in a frequency of a wave (e.g., sound or light) as the source of the wave (e.g., the receiver) and the destination of the wave (e.g., the satellite) move relative to one another. Here, this means that if the GNSS receiver is moving (e.g., a pedestrian walking or car driving), the motion of the GNSS receiver affects the frequency of the GNSS signal by some factor when compared to the GNSS signal being received by a stationary GNSS receiver. For instance, the speed (e.g., the velocity) of a GNSS-enabled device having the GNSS receiver will change the apparent frequency of the GNSS signal by the rate of wavelengths that the device moves through over some period of time. Since the frequency of the GNSS signal is known when the GNSS receiver is stationary, the change in frequency identifies the amount of Doppler effect that is impacting the frequency. By utilizing the Doppler effect at the GNSS receiver, this Doppler-based approach may accurately identify the position of the GNSS receiver. Since the Doppler-based approach does not rely on signal strength of the GNSS signal, the Doppler-based approach may enable the locational system to be effective even when the signal is being attenuated by other factors that commonly plague techniques like shadow-matching (e.g., the signal passing through additional mediums or the type of device associated with the GNSS receiver). Although this approach appears to cure a some of the headaches with the wrong-side-of-the-street problem, this approach is not without its own setbacks. For instance, this Doppler-based approach is inherently dependent on a moving GNSS receiver to generate a Doppler effect. Yet the GNSS receiver and/or the GNSS-enabled device with the GNSS receiver is not always in a state of motion. For example, if the GNSS receiver was being carried on a pedestrian sitting on a bench waiting for a bus, the Doppler-based approach would be ineffective to locate the GNSS receiver.

Since each of these approaches appear to have their benefits and drawbacks, GNSS localization in an urban environment is a ripe problem to address with a machine learning model. A machine learning model, unlike a hard-coded model, allows greater specification to the problem because a machine learning model does not solve for particular exceptions or issues, but rather learns correlations between features that train the model. Moreover, machine learning models are sometimes capable of identifying valuable correlations that were previously unnoticed. For instance, a machine learning model may identify correlations between the altitudes of particular satellites and the behaviors of the signals they transmit in an urban environment. Besides accounting for a wide array of features or even adapting to new features, a machine learning model also has the capability of blending some combination of modeled features of the urban environment and measured GNSS signal features. In other words, a machine learning model may receive, as input, modeled features that represent the urban space in addition to more traditional GNSS signal measurements. Some examples of modeled features include structures in the environment, foliage in the environment, signal path lengths for reflected signals, etc. This may be advantageous because, for example, the technique of traditional shadow matching often fails to account for various signal attenuation factors, such as foliage. Due to the seasonal and/or temporal nature of foliage, approaches tend to ignore foliage or indirectly account for it. For example, a deciduous tree undergoes seasonal effects such as shedding its leaves that may affect the attenuation of a signal while a coniferous tree does not. Any tree may also be trimmed or removed from the urban environment. The same may be true for building or other structures. They can undergo changes such as being torn down, raised, or even remodeled. As cities become more populated, a city may expand and add new buildings to accommodate for population growth. All these seasonal and temporal changes to a cityscape may impact how a signal from a satellite behaves on its path to the receiver. Attempting to address these variables in a rigid model or approach is difficult and often can overlook or fail to account for different nuances. Fortunately, a machine learning model is a flexible approach that inherently learns relationships between the features it receives as inputs and how the features define its output.

FIG. 1 is an example of an urban environment 100 where a GNSS-enabled device 110 (also referred to as a device 110) associated with a user 10 receives GNSS signals 22 transmitted from one or more satellites 20, 20a-n. For instance, FIG. 1 depicts two visible satellites 20, 20a-b Here, each satellite 20 is shown transmitting a line of sight signal 22, $22_{LOS}$ blocked by buildings 30 in the urban environment 100 and a reflected signal 22, $22_{REF}$ reflecting off a building 30, 30b in the environment 100 before it reaches the device 110 at the user 10. Although only two satellites 20 are depicted in the figure for simplicity, the GNSS-enabled device 110 may be configured to receive signals 22 at an antenna 112 associated with a GNSS receiver 114 transmitted from any GNSS satellite 20 within any of the GNSS constellations of satellites 20. In other words, the GNSS receiver 114 of the device 110 may receive signals 22 transmitted from satellites 20 associated with the Global Positioning System (GPS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS), and/or any similar systems, such as Low Earth Orbit or Geostationary satellites configured to transmit wireless signals. Moreover, although FIG. 1 depicts an urban environment 100, this is merely for illustration. The systems and methods herein may function in any environment such as a non-urban and/or semi-urban environment.

The device 110 includes an antenna 112 and a GNSS receiver 114 (also referred to as receiver 114). The antenna 112 is configured to function as an interface to receive a transmitted signal 22 (e.g., radio waves) from satellite 20 and to communicate the received signal 22 as an electrical input to the receiver 114. Generally speaking, based on the electrical input from the antenna 112, the receiver 114 is configured to interpret the message embodied in the received signal 22. With respect to a GNSS signal 22, the message typically indicates timing information (e.g., when the signal 22 was transmitted by the satellite 20) and positional information (e.g., information regarding the position of the satellite 20 when the transmission was sent). From the information, a locational system 200 in communication with the receiver 114 determines a location 12 of the recipient of the signal 22. In the examples shown, the location 12 of the recipient of the signal 22 is the location of the receiver 114, the device 110, and the user 10 since the receiver 114 is a component of the device 110 and the device 110 (e.g., shown as a mobile phone) is being carried by the user 10. Due to the synonymous locations of the device 110, the receiver 114, and the user 10 in these examples, the locations of these terms may be referred to interchangeably although it is conceivable that these locations may differ in other examples. For instance, the device 110 is a driver-less, self-driving vehicle with a GNSS receiver 114.

The device 110 may be any computing device capable of supporting the receiver 114. For instance, the device 110 is configured to support logic, circuitry, and/or code that is configured to determine its own location in response to a signal 22 from a satellite 20. Some examples of devices 110 include mobile devices (e.g., a mobile phone, laptop, tablet, mobile navigation device, etc.), vehicle electronics (e.g., vehicle control modules, avionics, boat electronics, etc.), wearables (e.g., smart watches or smart glasses), gaming devices, audio/video capturing devices (e.g., cameras or video cameras), and/or IoT devices (e.g., smart consumer electronics, smart appliances, smart speakers, smart home devices, smart meters, etc.). The device 110 includes data processing hardware 116 and memory hardware 118 in communication with the data processing hardware 116 and storing instructions, that when executed by the data processing hardware 116, cause the data processing hardware 116 to perform one or more operations (e.g., related to GNSS localization). In some examples, the device 110 includes one or more applications (i.e., software applications) where each application may utilize the locational system 200 associated with device 110 to perform various functions within the application. For instance, the device 110 includes a navigation application configured to display the location 12 of the device 110 for the user 10.

Furthermore, the device 110 may be configured to communicate via a network 120 with a remote system 130. The remote system 130 may include remote resources, such as remote data processing hardware 132 (e.g., remote servers or CPUs) and/or remote memory hardware 134 (e.g., remote databases or other storage hardware). The device 110 may utilize the remote resources to perform various functionality related to GNSS localization. For instance, the device 110 is configured to perform GNSS localization using the locational system 200. The locational system 200 may reside on the device 110 (referred to as on-device systems) or reside remotely (e.g., reside on the remote system 140), but in communication with the device 110. In some examples, some functionality of the locational system 200 resides locally or on-device while other functionality resides remotely. In other words, any of the functionality of the locational system 200 (e.g., an environment modeler 210 (FIG. 2) or a machine learning (ML) model 230 (FIG. 2)) may be local or remote in any combination. For instance, when the locational system 200 is rather large in size or processing requirements, the locational system 200 may reside in the remote system 130. Yet when the device 110 may support the size or the processing requirements of the locational system 200, the locational system 200 may reside on the device 110 using the data processing hardware 116 and/or the memory hardware 118. Optionally, the locational system 200 may reside both locally/on-device and remotely (e.g., as a hybrid of locally and remotely). For instance, the locational system 200 may default to execute on the remote system 130 when a connection to the network 120 between the device 110 and remote system 130 is available, but when the connection is lost or the network 120 is unavailable, the locational system 200 instead executes locally on the device 110.

The device 110 is in communication with the locational system 200 that is configured to perform GNSS localization for the receiver 114 and/or the device 110. The locational system 200 uses the ML model 230 (e.g., shown in FIGS. 2 and 3) to overcome the inaccuracies of a conventional GNSS localization system in order to determine a more accurate representation of the actual location 12, $12_A$ of the receiver 114. The ML model 230 may be interchangeably referred to as a GNSS localization model 230 for determining the actual location of the receiver 114 in the urban environment 100. Here, FIG. 1 provides some illustration of the output location 12, $12_{CON}$ generated by conventional GNSS localization (e.g., without the functionality of the locational system 200). In a system that performs conventional GNSS localization, the conventional system would identify the time-of-flight $TOF_{REF}$ for the signals 22 actually received at the receiver 114 (e.g., the reflected signals $22_{REF}$ that are not blocked by buildings 30) and interpret the location 12 of the device 110 at the conventional positions 12, $12a\text{-}b_{CON}$ shown in FIG. 1. In other words, the conventional system assumes the signal 22 is a line of sight signal $22_{LOS}$ rather than a reflected signal $22_{REF}$ and simply calculates the conventional position $12_{CON}$ as a straight line extension of the excess path length 24. For multiple signals 22 received at a receiver 114, GNSS localization would combine the determined location 12 for each satellite 20 to form an aggregate position. Here, the conventional system would combine the first conventional position 12, $12a_{CON}$ and the second conventional position 12, $12b_{CON}$ to form an aggregate position. As can be seen from FIG. 1, a GNSS localization process performed in a conventional manner would interpret the receiver 114 as being located on the wrong side of the street compared to the actual position 12, $12_A$ of the receiver 114. By being line-of-sight dependent, other attenuation factors that may cause a timing delay for the signal 22 are also often ignored; further contributing to the inaccuracy of conventional GNSS localization. For instance, trees 40, 40a-c such as a second tree 40, 40b in the parkway may cause signal receiving delays that result in the conventional GNSS localization to determine the conventional location $12_{CON}$ even further from the actual location $12_A$.

Figure 2:
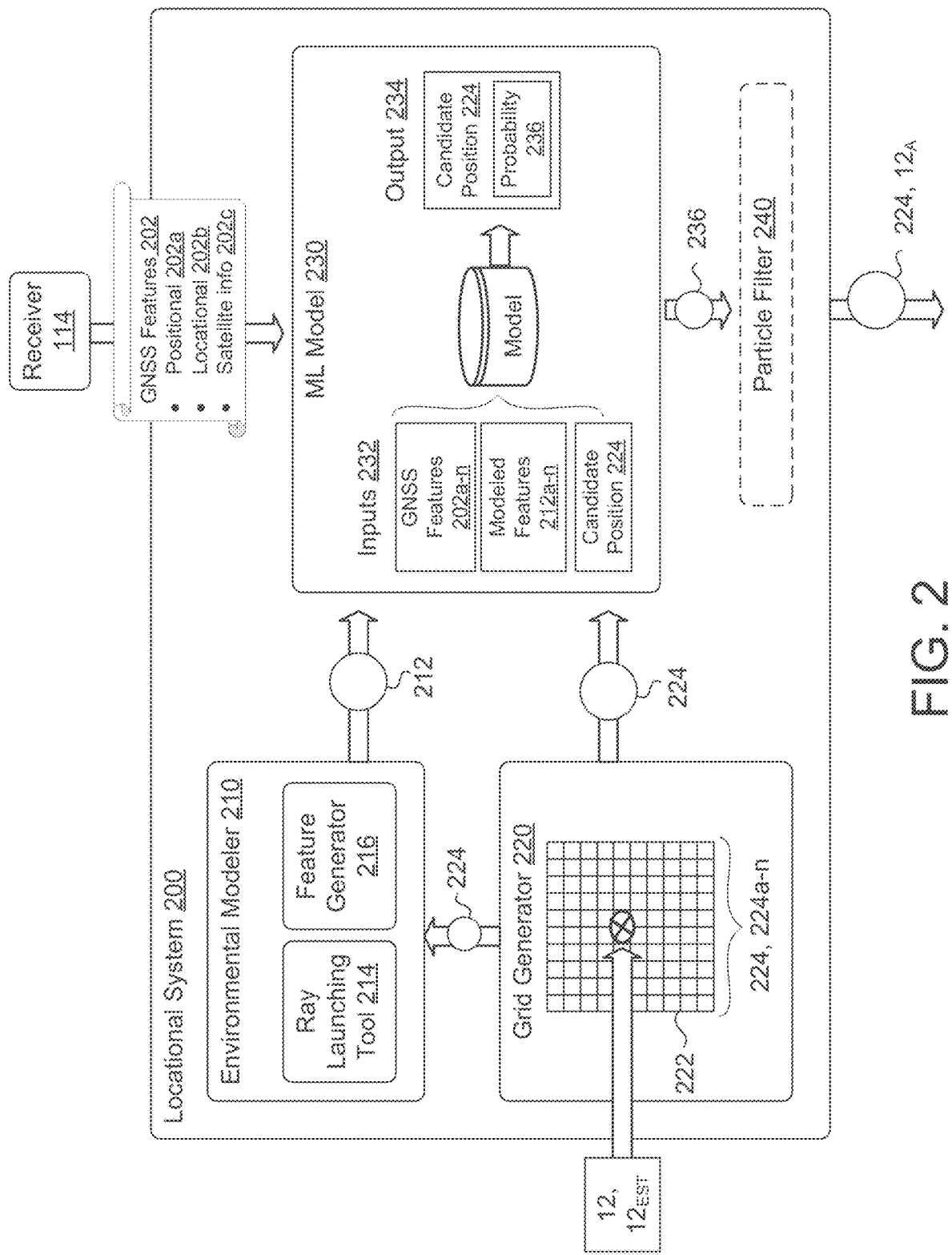
FIG. 2 is a schematic view of an example locational system for modeling mutable environmental structures.

Referring to FIG. 2, the locational system 200 is configured to obtain or to estimate an initial location 12, $12_{EST}$ for the receiver 114, to generate a plurality of candidate actual locations 224, 224a-n for the receiver 114. Then, from the plurality of candidate actual locations 224, the locational system 200 is configured to use the model 230 to generate an indication (e.g., a probability) that a candidate location 224 likely includes the actual location $12_A$ for the receiver 114. To perform these operations, the locational system 200 generally includes an environmental modeler 210, a grid generator 220, and a machine learning (ML) model 230 (also referred to as the model 230).

The environmental modeler 210 (also referred to as the modeler 210) enables the locational system 200 to have a better understanding of the urban environment 100 itself and/or how the urban environment 100 is likely to impact a signal 22 from a satellite 20. In other words, inferring features or impacts of the urban environment 100 solely from GNSS measurements can prove difficult, if not impossible without further information. To illustrate, although a GNSS measurement may detect a reduction in signal strength and infer that the signal 22 is attenuated, a receiver 114 may be unable to differentiate different types of attenuated signals 22 such as a signal 22 traveling through a medium other than air (e.g., the tree 40, 40a) from a reflected signal 22. This may impact locational accuracy because a line of sight signal $22_{LOS}$ that is attenuated through a tree 40 means the receiver 114 is still located at the line-of-sight location $12_{CON}$ while an attenuated signal that is a reflected signal $12_{REF}$ means the receiver 114 is located not at the line-of-sight location $12_{CON}$, but rather where the final reflection terminates (e.g., shown as the actual location $12_A$ in FIG. 1). In order to ensure that the model 230 is a robust model at predicting the actual location $12_A$ of the receiver 114, the environmental modeler 210 generates modeled features 212 for input into the model 230.

In some examples, the modeler 210 includes a ray launching tool 214 and a feature generator 216. As mentioned previously, the ray launching tool 214 and/or the feature generator 216 may not reside together (e.g., on the device 110 or the remote system 140). For instance, the ray launching tool 214 and/or the feature generator 216 may be an application (e.g., an application programming interface (API)) hosted on the remote system 140, but accessible to the device 110 via the locational system 200. The modeler 210 may use the ray launching tool 214 or some similar tool to identify aspects of the environment that may affect a signal 22 and therefore have some influence on the actual location 124 of the receiver 114. In some implementations, the ray launching tool 214 is configured to simulate a ray or a path for a signal 22. By simulating the path for a signal 22, the ray launching tool 214 may identify features in the environment 100 that may impact the path of the signal 22 or the time-of-flight TOF for the signal 22. In other words, the ray launching tool 214 is capable of identifying features in the environment 100 that intersect the path of the signal 22 to the satellite 20.

In some examples, the ray launching tool 214 receives a hypothesized position (e.g., an x-y position or a longitude-latitude on Earth's surface) and simulates the path for the signal 22 from a satellite 20 by propagating rays from multiple directions from the hypothesized position. By launching each of the propagated rays in each direction, the ray launching tool 214 models whether a particular ray terminates at the known location for the satellite 20. In other words, since satellites 20 broadcast their position in their signal transmissions, the ray launching tool 214 attempts to work backwards and trace a ray from a hypothetical position of a recipient of a signal 22 to a broadcasted location of a satellite 20. When a ray terminates at a known satellite location, the ray launching tool 214 identifies the ray as a path for the signal 22. To accurately ray launch for the urban environment 100, the ray launching tool 214 has access to or obtains a structure model or building model for the urban environment 100. For instance, the structure model includes building dimensions and characteristics of structures/terrain within the urban environment 100 (e.g., buildings 30, trees 40, signs, etc.). The structure model may correspond to image data (e.g., three-dimensional image data such as aerial image data or satellite image data) for the urban environment 100. There may also be multiple structure models to account for temporal or seasonal conditions that correspond to the timing of when a receiver 114 receives a signal 22. For example, a winter structure model that represents deciduous trees 40 without leaves and a summer structure model that represents deciduous trees 40 with leaves. In some configurations, instead of the structure model accounting for seasonal or temporal conditions, these conditions are accounted for at the feature generator 216. In other words, the feature generator 216 generates a feature 212 that indicates that the timing of the signal 22 corresponds to summer (i.e., a seasonal feature) or that the weather was raining in the urban environment 100 at the time the receiver 114 received the signal 22 (i.e., a temporal feature). By having a variety of environmental and terrain characteristics for the urban environment 100, the structure model allows the ray launching tool 214 to determine in what propagated direction a ray will encounter a structure that would impact the ray (e.g., reflect or delay the ray) and in what manner the characteristics of the structure will likely impact the ray (e.g., how the ray would reflect off of the structure or delay a signal 22).

In some examples, the locational system 200 uses the functionality of the ray launching tool 214 to understand a reflected signal $22_{REF}$ with an excess path length 24 (e.g., to determine the excess path length 24). Referring back to FIG. 1, each reflected signal $22_{REF-a,b}$ from the first and second satellites 20a-b includes an excess path length 24 (e.g., shown as a first excess path length 24, 24a and a second excess path length 24, 24b). As previously stated, the excess path length 24 is the difference between a length of the reflected signal $22_{REF}$ and a length of a line of sight signal $22_{LOS}$ from the same satellite 20. For instance, FIG. 1 depicts the length of the line of sight signal $22_{LOS}$ for the first satellite 20a as a combination of the dotted line that terminates at the user 10 and the solid line terminating at the first building 30, 30a. Based on this line of sight signal length, the excess path length 24a for the reflected signal $22_{REF}$ from the first satellite 20a is shown as the block portion along the reflected signal 22, $22_{REF-a}$. The excess path length 24, 24b for the second satellite 20b is shown in a similar manner. Additionally or alternative, as an ancillary output to the potential path of the signal 22, the ray launching tool 214 may provide an indication about the probability that the signal 22 is a line of sight signal $22_{LOS}$ or a reflected signal $22_{REF}$.

In some configurations, the feature generator 216 is configured to generate modeled features 212 for the path of the signal 22 and/or the environment encountered by the signal 22 along its path. For instance, the modeled features 212 are modeled signal attenuation features (e.g., that the ray launching tool 214 identifies) that change a characteristic of a signal 22 (e.g., its path, its strength, and/or delay its receipt). Here, a modeled feature 212 refers to a variable that is input into the ML model 230 to represent a characteristic of the signal 22 that the receiver 114 is unable to measure (e.g., directly) from the signal 22 (i.e., not a GNSS measurement). Some examples of modeled features 212 include an excess path length 24 for a signal 22, an indication of the level of certainty of the excess path length 24 for the signal 22, a probability of the type of signal 22 (e.g., probability that the signal 22 is a line of sight signal $22_{LOS}$ or reflected signal $22_{REF}$), deciduousness of tree foliage, an indication of temporal conditions (e.g., weather conditions or changes to buildings 30), or any other characteristics of the urban environment 100 itself or how the path of the signal 22 behaves in the urban environment 100. These modeled features 212 may be determined by the ray launching tool 214, the feature generator 216, or another system in communication with the feature generator 216. For instance, the ray launching tool 214 identities a characteristic of the path of the signal 22 and the feature generator 216 converts that characteristic into a modeled feature 212 (e.g., input format for the ML model 230).

Generally speaking, GNSS measurements or raw GNSS measurements refer to signal-based information that is processed or interpreted at the receiver 114 based on a signal 22. Satellites 20 typically broadcast a signal 22 as a radio wave at an operating frequency and wavelength in the L-band (i.e., a band of the radio spectrum internationally designated for GNSS technologies) at a time according to their atomic clocks. The broadcasted signal 22 from a satellite 20 has a frequency in the L-band, satellite information (e.g., coded satellite information), and carries a navigation message. The navigation message includes timing information, such as a time at the satellite that the satellite transmitted the signal 22 and a time of arrival of the signal 22 at the receiver 114/antenna 112, and positional information, such as a location of the satellite at the time of transmission. By having the time-of-flight TOF by the combination of the time of transmission and the time of arrival, the receiver 114 can measure a pseudorange corresponding to the range between the receiver 114 and the satellite 20 that sent the signal 22. To determine the satellite-to-receiver distance, the receiver 114 scales the pseudorange by the speed of light. This timing information also provides the receiver 114 with an understanding of a clock timing at the satellite (e.g., from the time of transmission) with respect to a clock timing at the receiver 114 (e.g., from the time of arrival). When the receiver 114 receives a signal 22, the receiver 114 is also configured to measure the strength of the signal 22 (e.g., in decibels (dBm or dBHz)). In addition to the timing information and positional information, the signal-based information of the signal 22 includes satellite information. This satellite information may identify a unique identifier indicating the particular satellite 20 transmitting the signal 22 and the constellation for that particular satellite 20 (e.g., GPS, GLONASS, GALILEO, QZSS, BeiDou or IRNSS). In contrast to modeled features 212, 212a-n, GNSS features 202, 202a-n may refer to any of the timing information 202, 202a, the positional information 202, 202b, the satellite information 202, 202c, any measurements the receiver 114 computes from this type of information, or any combination thereof. In some implementations, the locational system 200 is configured to perform GNSS measurements and/or computations instead of, or alternatively to, the receiver 114 in order to generate measured GNSS features 202.

In some examples, the grid generator 220 receives an estimated location $12_{EST}$ (also referred to as an estimated position) from the locational system 200 or some other system in communication with the locational system 200. For instance, the estimated location $12_{EST}$ may correspond to a location 12 where a conventional GNSS localization system believes the receiver 114 to be located (e.g., the conventional location $12_{CON}$ based on a line of sight assumption for the signal 22). In other examples, the grid generator 220 generates the estimated location $12_{EST}$ itself (e.g., based on conventional GNSS localization). In either approach, with the estimated location $12_{EST}$, the grid generator 220 generates a plurality of positions about the estimated location $12_{EST}$ (i.e., adjacent to or radiating outward from the estimated location $12_{EST}$) where each position of the plurality of positions corresponds to a candidate position 224 for the actual location $12_A$ of the receiver 114. Therefore, although the conventional location $12_{CON}$ for the receiver 114 is inaccurate, this conventional location $12_{CON}$ is unlikely to be so grossly inaccurate that the plurality of candidate positions 224 would not include the actual position $12_A$. Moreover, if this appears to be the case, the grid generator 220 may be configured to adjust the resolution regarding the size of each candidate position 224 and/or the number of candidate positions 224 that are generated about the estimated location $12_{EST}$.

In some examples, in order to ensure that each position about the estimated location $12_{EST}$ is systematically analyzed, the grid generator 220 generates the plurality of the candidate positions 224 as a grid 222 where each point in the grid 222 represents a candidate position 224. For instance, FIG. 2 illustrates a grid 222 where the center of the grid 222 is the estimated location $12_{EST}$ with candidate positions 224 generated in each direction about the estimated location $12_{EST}$ (e.g., northerly, southerly, easterly, and westerly). The grid 222, or, more generally the plurality of candidate positions 224, represent potential locations 12 where the receiver 114 may be located on a plane parallel to Earth's surface. In some implementations, when the grid generator 220 generates the plurality of candidate positions 224, the grid generator 220 may also model or take into account buildings 30 or other structures. For instance, the grid generator 220 may ignore generating a candidate position 224 where it knows there is a building 30 or other structure. In some examples, the grid generator 220 operates in conjunction with the modeler 210 such that the grid generator 220 communicates one or more candidate positions 224 to the modeler 210 (e.g., to the ray launching tool 214) and the modeler 210 generates modeled features 212 for the one or more candidate positions 224.

The ML model 230 is configured to receive one or more inputs 232 and predict an output 234 based on the received one or more inputs 232. Here, the inputs 232 to the ML model 230 include the modeled features 212, the measured GNSS features 202 (also collectively referred to as GNSS-related features), and a candidate position 224. Based on this input 232, the model 230 predicts an indication of whether the candidate position 224 is the actual location $12_A$ of the receiver 114. In other words, the model 230 serves as a fitness function or evaluation function for the problem of where the receiver 114 is actually located. Here, each candidate position 224 fed to the ML model 230 is a candidate solution as to where the receiver 114 is located that the ML model 230 evaluates based on input features 202, 212. For instance, the model 230 predicts a probability 236 of whether the candidate position 224 is the actual location $12_A$ of the receiver 114 where the probability 236 represents how likely a candidate position 224 is to be or to include the actual location $12_A$ of the receiver 114. In some examples, the ML model 230 transforms the grid 222 of candidate positions 224 into a grid 222 of probabilities 236 where each probability 236 corresponds to candidate position 224. This grid 222 of probabilities 236 may then be used in conjunction with a particle filter 240 (e.g., shown as optional in FIG. 2) to identify the actual location $12_A$ for the receiver 114. Additionally or alternatively, using the probabilities 236 for all candidate positions 224 fed to the ML model 230, the locational system 200 may select the candidate position 224 with the greatest probability as the candidate position 224 that represents the actual position $12_A$.

In some examples, the ML model 230 is a deep neural network with multiple layers included in the network. For instance, the ML model 230 is a fully supervised neural network. In some implementations, the ML model 230 is a convolutional neural network (CNN) that includes one or more layers that extract features from input data (e.g., the inputs 232) and classify the extracted features (e.g., to identify whether a candidate position 224 is likely the actual location $12_A$ for the receiver 114). A CNN refers to a neural network topology where different features are extracted through convolution using weighted filters whose weights are automatically learned during training. For example, the model 230 extracts or identifies features that may indicate that the candidate position 224 resembles an actual location $12_A$ for a receiver 114 and weighs those features for classification of whether the actual location $12_A$ is represented by the candidate position 224. In some configurations, the model 230 is a CNN that performs 3D convolution where two of the dimensions correspond to the candidate position 224 (e.g., an x-y coordinate or longitude and latitude for the candidate position 224) and the third dimension relates to the satellites 20 that transmit a signal 22 to the receiver 114 (e.g., visible satellites to the receiver 114). Here, for each combination of dimensions, the model 230 includes individual channels corresponding to features 202, 212. With ML models, more features 202, 212 may be included in the model 230 or the model 230 may extend its processing to additional dimensions (e.g., a fourth dimension). When compared to, for example, hand-built heuristics, a neural network is able to leverage overlapping receptive fields. In other words, the probability 236 of one candidate position 224 may influence the probability 236 of a neighboring candidate position 224.

In some configurations, the model 230 generates the probability 236 in three stages. In a first stage, the model 230 performs 3D convolution on the three dimensions of the candidate position 224 and satellite 20. In a second stage, the model 230 subsequently performs 2D convolution on the two, position-based dimensions of a candidate position 224. Finally, the third stage is a fully-connected layer that processes all of the candidate positions 224 for a grid 222. With this approach, the model 230 first classifies each candidate location 224 by satellite 20 and then joins these classifications together to represent all satellites 20 at a particular candidate location 224. At this point, the model 230 has constructively generated a likelihood that a particular candidate location 224 represents the actual location $12_A$. The third stage then converts this likelihood generated for each individual candidate position 224 into a probability 236 for each candidate 224 within the grid 222. In this example, the probability 236 represents the probability 236 that a particular candidate position 224 is the actual location $12_A$ of the receiver 114 relative to the other candidate positions 224 in the grid 222. In other words, the candidate position 224 with the greatest probability is more akin to a local maxima within the grid 222 of candidate positions 224. For instance, the model 230 may process multiple grids 222 and the particle filter 240 may filter the multiple grids 222 to determine the actual location $12_A$.

Generally speaking, a particle filter (e.g., the particle filter 240) has a functionality that enables the particle filter to consider estimations for different epochs related to a trajectory of the receiver 114. The locational system 200 may use a particle filter because there may be useful information captured over time. Yet unfortunately, there is some information that is inaccessible to a particle filter. For instance, if the receiver 114 receives a signal 22 with multiple reflections where the reflections interfere with one another, the signal strength and excess path length 24 for that signal 22 should oscillate over a period of a few seconds as the different reflections go in and out of phase. Here, if the locational system 200 processed epochs sequentially one at a time, the locational system 200 would not be able to observe this oscillation nor communicate this information to its particle filter.

In some examples, the model 230 is a CNN that performs 4D convolution that is able to account for some period of time (e.g., a small window of a few seconds inaccessible to a particle filter). Here, like the 3D convolution version, two of the dimensions correspond to the candidate position 224, a third dimension relates to the satellites 20 that transmit a signal 22 to the receiver 114 (e.g., visible satellites to the receiver 114), and a fourth dimension is a time-based dimension. With a time-based dimension, the model 230 is able to predict an output 234 that accounts for data from previous GNSS measurements (e.g., previous GNSS features 202). For instance, the model 230 may be an extension of the 3D CNN model where the 4D CNN layer(s) for the fourth dimension of time is propended onto the 3D CNN model. In other words, the 4D CNN layer(s) that incorporate the time dimension occur before the 3D CNN and fully connected layers. For example, the 4D CNN for the time dimension occurs prior to the three stage process previously described with respect to the 3D CNN of the model 230. Alternatively, the model 230 may account for a time dimension with a recurrent neural network (RNN) that examines one epoch at a time and produces a partial output for that particular epoch that feeds as in input into a subsequent epoch. Here, with an RNN approach, the model 230 may not need to be configured with a particular number of epochs (e.g., unlike a CNN-approach).

In some implementations, in order for the model 230 to include a time dimension, the model 230 may need to account for the fact that the prediction of the candidate position 224 that resembles the actual location $12_A$ for the receiver 114 changes (e.g., moves in position) over time. To account for this change, the model 230 may be configured to either have a mechanism that indicates that the grid 222 of candidate positions 224 has changed over time (i.e., moved) or have a mechanism to maintain the position of the grid 222 for a time window (e.g., a few seconds) that ensures that the receiver 114 did not exit the grid 222. Additionally, the model 230 may also need to account for the fact that raw GNSS measurements (e.g., some GNSS features 202) may correspond to different detected signals 22. Since these GNSS measurements may be for different signals 22, the model 230 may be fed the features 202 in a format that identifies which GNSS measurements (e.g., GNSS features 202) correspond to which satellites 20 (and/or frequency bands). For example, the model 230 receives an ordered feature vector that includes the features 202, 212 in an order where a particular position in the feature vector corresponds to a particular satellite 20 (and/or frequency band). In this approach, positions of the feature vector may be left blank as placeholders when a particular epoch of time does not include a GNSS measurement for that satellite 20.

Figure 3:
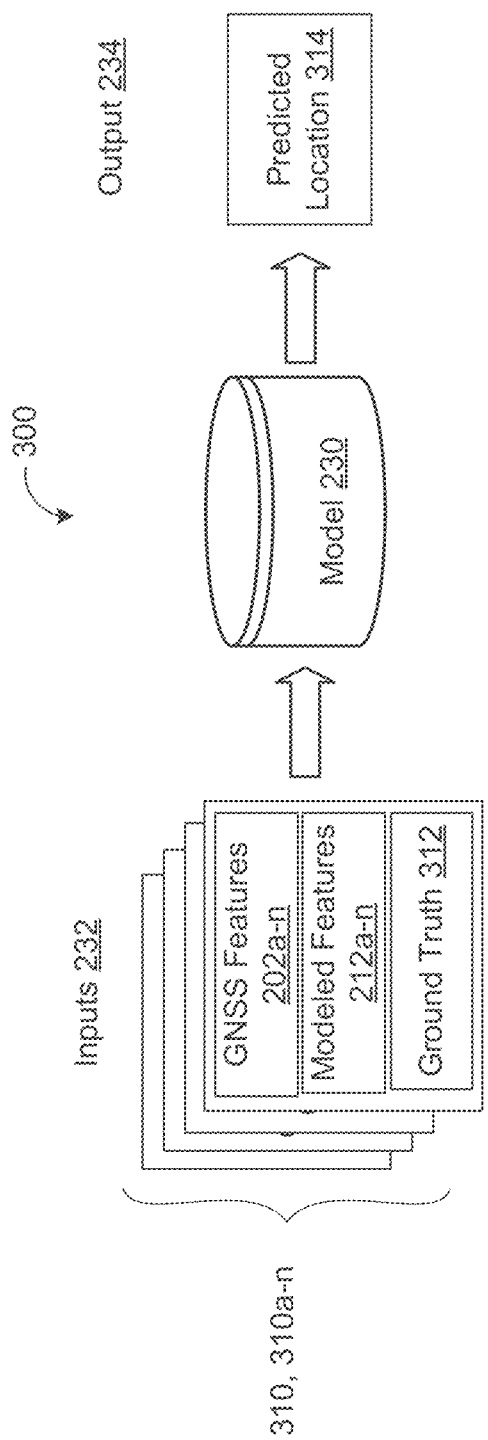
FIG. 3 is a schematic view of an example training process for training a model for mutable environmental structures.

Referring to FIG. 3, in order for the model 230 to learn how to predict which candidate position 224 resembles the actual location $12_A$ for the receiver 114, the model 230 undergoes a training process 300. Here, the training process 300 trains the model 230 using a plurality of training examples 310 310a-n. Generally speaking, a machine learning model is trained on a set of input variables referred to as features. When training, the training process 300 uses training examples that correspond to particular instances of the features. For example, when training the model 230, each training example 310 may include one or more GNSS measured features 202 and one or more modeled features 212 (e.g., modeled signal attenuation features). Each training example 310 also includes a label 312 of the actual location $12_A$ for the receiver 114 as a ground truth. The label 312 for a training example therefore functions to identify where the receiver 114 was actually located when the particular features 202, 212 of that training example 310 existed. The training process 300 feeds the training examples 310 as inputs 232 into the model 230 to enable the model 230 to learn correlations between the features 202, 212 and the ground truth 312 (i.e., actual location $12_A$ of the receiver 114) and to generate a prediction 314 for the label. In other words, during training, the model 230 predicts a location 12 for the receiver 114. After being trained on numerous training examples 310, the model 230 may be tested for accuracy by passing the model 230 a set of test training examples 310. Here, the training examples 310 used for testing the model 230 are typically training examples 310 that the model 230 has not previously seen prior to testing. Once the model 230 is able to predict the actual location $12_A$ of the receiver 114 with high precision, the training process 300 is complete and the model 230 is considered trained. After being trained, the model 230 may be implemented in run-time or inference.

Figure 4:
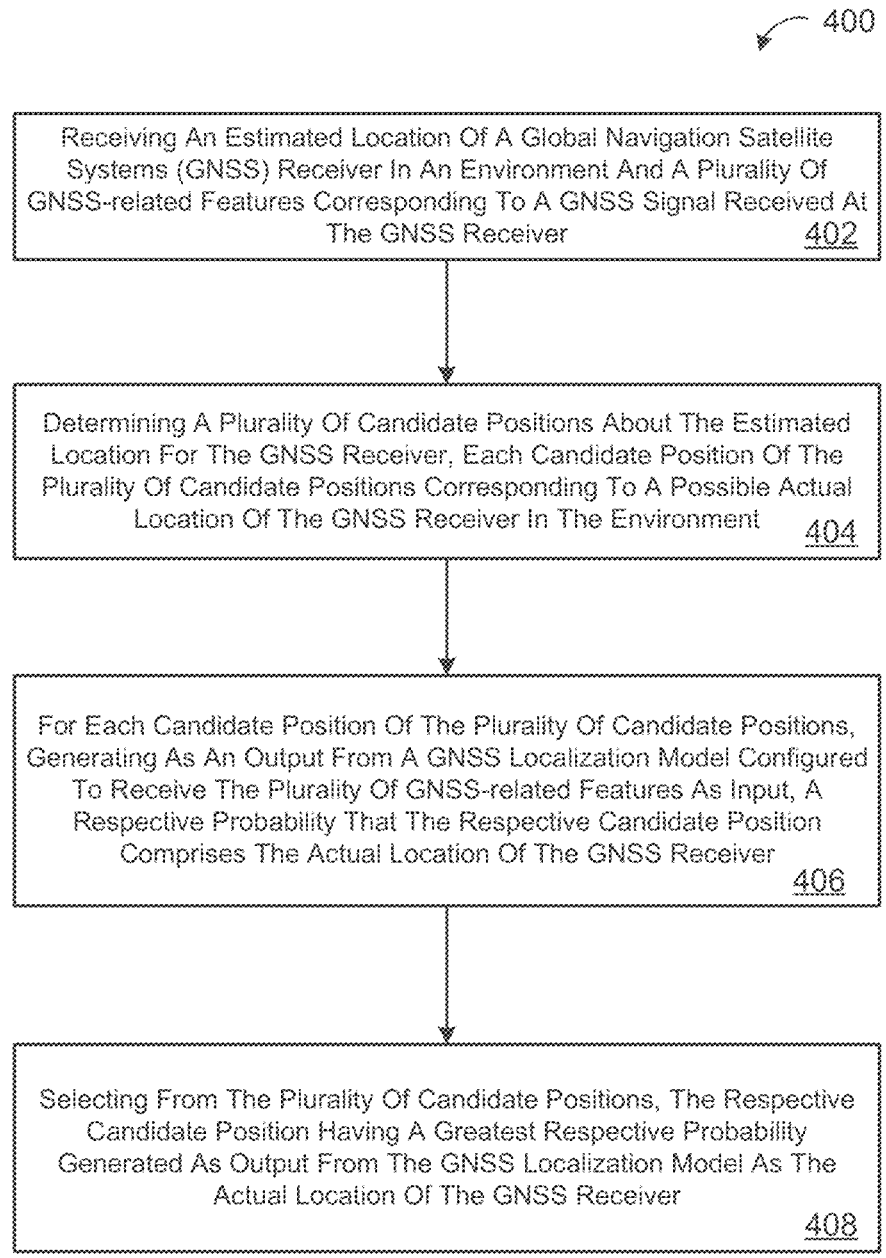
FIG. 4 is a flowchart of an example arrangement of operations for a method of modeling mutable environmental structures.

FIG. 4 is a flowchart of an example arrangement of operations for a method of modeling mutable environmental structures. At operation 402, the method 400 receives an estimated location $12_{EST}$ of a Global Navigation Satellite Systems (GNSS) receiver 114 in an environment 100 and a plurality of GNSS-related features 202, 212 corresponding to a GNSS signal 22 received at the GNSS receiver 114. At operation 404, the method 400 determines a plurality of candidate positions 224 about the estimated location $12_{EST}$ for the GNSS receiver 114. Each candidate position 224 of the plurality of candidate positions 224a-n corresponds to a possible actual location $12_A$ of the GNSS receiver 114 in the environment 100. For each candidate position 224 of the plurality of candidate positions 224a-n, at operation 406, the method 400 generates as an output 234 from a GNSS localization model 230 configured to receive the plurality of GNSS-related features 202, 212 as input 232, a respective probability 236 that the respective candidate position 224 includes the actual location $12_A$ of the GNSS receiver 114. At operation 408, the method 400 selects, from the plurality of candidate positions 224a-n, the respective candidate position 224 having a greatest respective probability 236 generated as output 234 from the GNSS localization model 230 as the actual location $12_A$ of the GNSS receiver 114.

Figure 5:
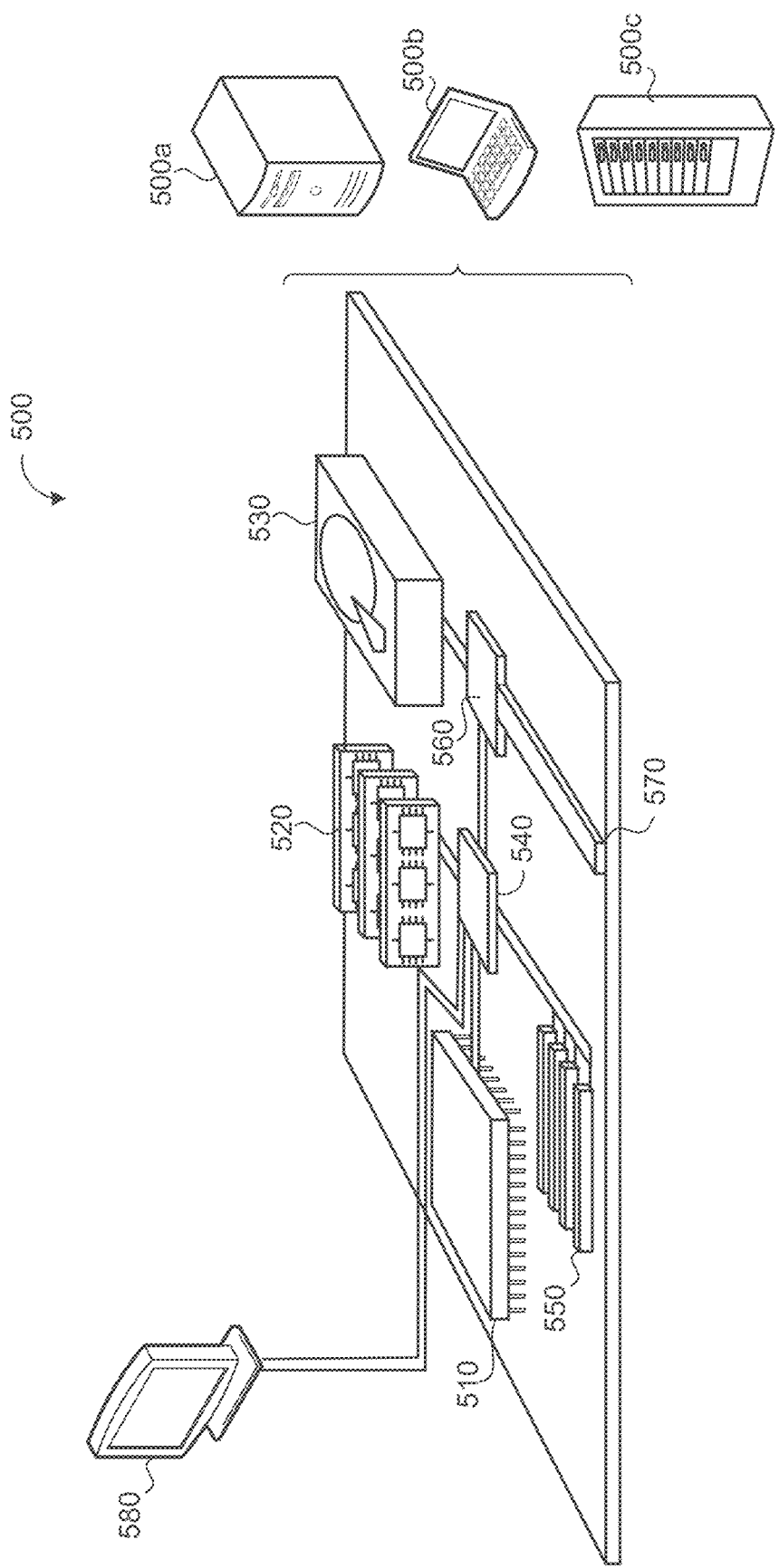
FIG. 5 is a schematic view of an example computing device that may be used to implement the systems and methods described herein.

FIG. 5 is a schematic view of an example computing device 500 that may be used to implement the systems (e.g., the locational system 200) and methods (e.g., method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 550 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware:
an estimated location of a Global Navigation Satellite Systems (GNSS) receiver in an environment; and
a plurality of GNSS-related features corresponding to a GNSS signal received at the GNSS receiver;
determining, by the data processing hardware, a plurality of candidate positions about the estimated location for the GNSS receiver, each candidate position of the plurality of candidate positions corresponding to a possible actual location of the GNSS receiver in the environment;
after determining the plurality of candidate positions, for each respective candidate position of the plurality of candidate positions:
obtaining, by the data processing hardware, a respective modeled feature that indicates a condition of the environment when the GNSS receiver receives the plurality of GNSS-related features; and
generating, by the data processing hardware, using a GNSS localization model, a respective probability that the respective candidate position comprises the actual location of the GNSS receiver based on the plurality of GNSS related features, the respective modeled feature, and the respective candidate position; and
selecting, by the data processing hardware, from the plurality of candidate positions, the respective candidate position having a greatest probability generated as output from the GNSS localization model as the actual location of the GNSS receiver.

2. The method of claim 1, wherein the GNSS localization model is trained on a plurality of training examples, each training example comprising:
GNSS measured features for a respective GNSS signal;
modeled signal features for the respective GNSS signal; and
a corresponding label indicating a respective actual location of a respective GNSS receiver receiving the respective GNSS signal.

3. The method of claim 2, wherein the GNSS measured features comprise at least one of positional information, timing information, or satellite information.

4. The method of claim 2, wherein the GNSS measured features comprise a pseudorange from a satellite transmitting the GNSS signal and a time of flight for the GNSS signal.

5. The method of claim 2, wherein the modeled signal features comprise one or more features related to an excess signal length for the GNSS signal.

6. The method of claim 2, wherein at least one of the modeled signal features comprises a feature indicating a deciduousness of foliage for the environment.

7. The method of claim 6, wherein the feature indicating the deciduousness of foliage for the environment represents a seasonality attribute of the foliage.

8. The method of claim 1, wherein the GNSS localization model comprises a convolutional neural network configured to:
for each candidate position of the plurality of candidate positions:
perform three-dimensional (3D) convolution for a first dimension comprising a latitude of the respective candidate position, a second dimension comprising a longitude of the respective candidate position, and a third dimension representing a satellite transmitting the GNSS signal to the GNSS receiver; and
based on the 3D convolution, perform two-dimensional (2D) convolution for the first dimension and the second dimension; and
after the 2D convolution, process all of the candidate positions using a fully-connected layer.

9. The method of claim 8, further comprising particle filtering, by the data processing hardware, the respective probability generated as the output from the GNSS localization model for each candidate position of the plurality of candidate positions to identify the actual location of the GNSS receiver as the respective candidate position having the greatest probability.

10. The method of claim 8, wherein the convolutional neural network is further configured to, for each candidate position of the plurality of candidate positions, perform four-dimensional (4D) convolution for a fourth dimension of time.

11. The method of claim 1, further comprising:
identifying, by the data processing hardware, that the GNSS signal comprises a reflected GNSS signal;
determining, by the data processing hardware, an excess path length for the reflected GNSS signal; and
based on the excess path length, generating, by the data processing hardware, one or more respective GNSS-related features for input into the GNSS localization model.

12. The method of claim 1, wherein the GNSS signal received at the GNSS receiver comprises a reflected GNSS signal having one or more reflections within the environment.

13. A system comprising:
data processing hardware; and
memory hardware in communication with the data processing hardware, the memory hardware storing instructions that when executed on the data processing hardware cause the data processing hardware to perform operations comprising:
receiving:
an estimated location of a Global Navigation Satellite Systems (GNSS) receiver in an environment; and a plurality of GNSS-related features corresponding to a GNSS signal received at the GNSS receiver;

determining a plurality of candidate positions about the estimated location for the GNSS receiver, each candidate position of the plurality of candidate positions corresponding to a possible actual location of the GNSS receiver in the environment;

after determining the plurality of candidate positions, for each respective candidate position of the plurality of candidate positions:

obtaining a respective modeled feature that indicates a condition of the environment when the GNSS receiver receives the plurality of GNSS-related features; and generating using a GNSS localization model, a respective probability that the respective candidate position comprises the actual location of the GNSS receiver based on the plurality of GNSS related features, the respective modeled feature, and the respective candidate position; and selecting from the plurality of candidate positions, the respective candidate position having a greatest probability generated as output from the GNSS localization model as the actual location of the GNSS receiver.

14. The system of claim 13, wherein the GNSS localization model is trained on a plurality of training examples, each training example comprising:

GNSS measured features for a respective GNSS signal;
modeled signal features for the respective GNSS signal; and
a corresponding label indicating a respective actual location of a respective GNSS receiver receiving the respective GNSS signal.

15. The system of claim 14, wherein the GNSS measured features comprise at least one of positional information, timing information, or satellite information.

16. The system of claim 14, wherein the GNSS measured features comprise a pseudorange from a satellite transmitting the GNSS signal and a time of flight for the GNSS signal.

17. The system of claim 14, wherein the modeled signal features comprise one or more features related to an excess signal length for the GNSS signal.

18. The system of claim 14, wherein at least one of the modeled signal features comprises a feature indicating a deciduousness of foliage for the environment.

19. The system of claim 18, wherein the feature indicating the deciduousness of foliage for the environment represents a seasonality attribute of the foliage.

20. The system of claim 13, wherein the GNSS localization model comprises a convolutional neural network configured to:

for each candidate position of the plurality of candidate positions:

perform three-dimensional (3D) convolution for a first dimension comprising a latitude of the respective candidate position, a second dimension comprising a longitude of the respective candidate position, and a third dimension representing a satellite transmitting the GNSS signal to the GNSS receiver; and based on the 3D convolution, perform two-dimensional (2D) convolution for the first dimension and the second dimension; and after the 2D convolution, process all of the candidate positions using a fully-connected layer.

21. The system of claim 20, wherein the operations further comprise particle filtering the respective probability generated as the output from the GNSS localization model for each candidate position of the plurality of candidate positions to identify the actual location of the GNSS receiver as the respective candidate position having the greatest probability.

22. The system of claim 20, wherein the convolutional neural network is further configured to, for each candidate position of the plurality of candidate positions, perform four-dimensional (4D) convolution for a fourth dimension of time.

23. The system of claim 13, wherein the operations further comprise:

identifying that the GNSS signal comprises a reflected GNSS signal;
determining an excess path length for the reflected GNSS signal; and
based on the excess path length, generating one or more respective GNSS-related features for input into the GNSS localization model.

24. The system of claim 13, wherein the GNSS signal received at the GNSS receiver comprises a reflected GNSS signal having one or more reflections within the environment.

* * * * *